(No Model.) 4 Sheets—Sheet 1.
W. D. THOMAS & L. R. GIGNILLIAT.
BRAKE MECHANISM AND CONTROLLER FOR ELECTRIC CARS.
No. 576,384. Patented Feb. 2, 1897.
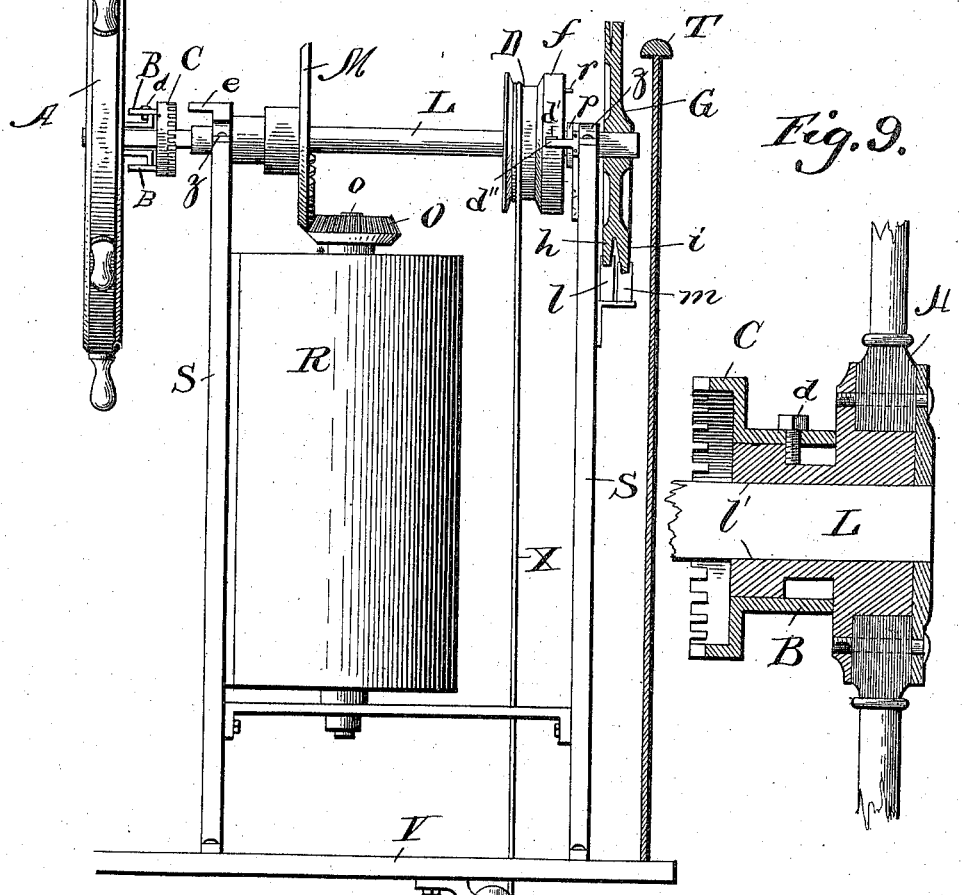
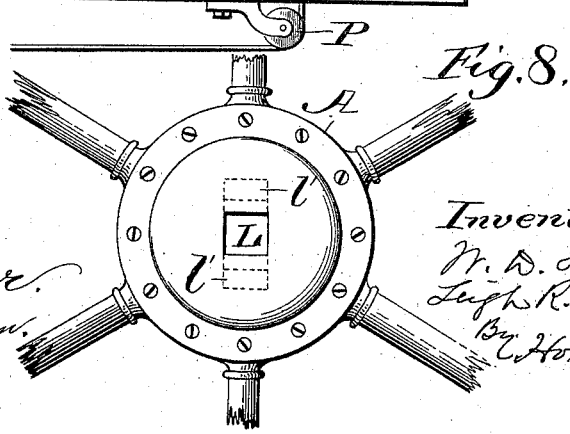
Witnesses:
Inventors.
W. D. Thomas
Leigh R. Gignilliat,
By Howson & Howson
Attys.

(No Model.) 4 Sheets—Sheet 2.

W. D. THOMAS & L. R. GIGNILLIAT.
BRAKE MECHANISM AND CONTROLLER FOR ELECTRIC CARS.

No. 576,384. Patented Feb. 2, 1897.

Witnesses:
J. B. McGirr.
J. P. Appleman.

Inventors.
W. D. Thomas,
Leigh R. Gignilliat,
By Howson & Howson,
Attys.

(No Model.) 4 Sheets—Sheet 4.
W. D. THOMAS & L. R. GIGNILLIAT.
BRAKE MECHANISM AND CONTROLLER FOR ELECTRIC CARS.
No. 576,384. Patented Feb. 2, 1897.

Current on

Current off
Slack up

Brakes on

Brakes released

Current reversed

Current off

No effect

Brake drum clutched

Current on
Slack out

Witnesses:
J. B. McGirr.
J. P. Appleman.

Inventors,
W. D. Thomas,
Leigh R. Gignilliat,
By Howson & Howson
Attys.

UNITED STATES PATENT OFFICE.

WALTER DULIN THOMAS AND LEIGH ROBINSON GIGNILLIAT, OF SAVANNAH, GEORGIA.

BRAKE MECHANISM AND CONTROLLER FOR ELECTRIC CARS.

SPECIFICATION forming part of Letters Patent No. 576,384, dated February 2, 1897.

Application filed June 2, 1896. Serial No. 594,038. (No model.)

*To all whom it may concern:*

Be it known that we, WALTER DULIN THOMAS and LEIGH ROBINSON GIGNILLIAT, citizens of the United States, residing in Savannah, Chatham county, Georgia, have invented certain new and useful Improvements in Brake Mechanism and Controllers for Electric Cars, of which the following is a specification.

Our invention relates to controlling devices for electric cars; and our object is to provide an improved controlling device for such cars in which the brake mechanism and current-regulator may both be operated from a single operating device or shaft, thereby avoiding the usual necessity of having two separate handles or hand-wheels, one for the current controller or regulator and the other for the brake mechanism.

With this object in view our invention consists of the novel construction and details thereof as hereinafter described, and pointed out in the claims, with reference to the accompanying drawings, in which—

Figure 2:
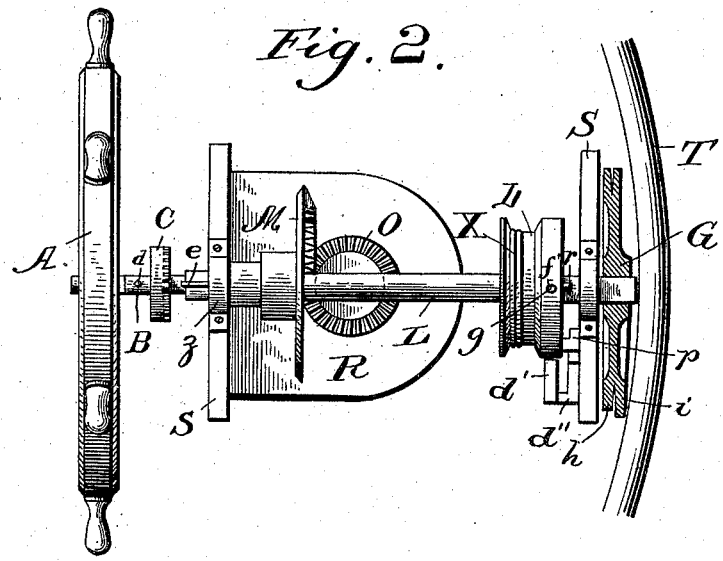
Figure 3:
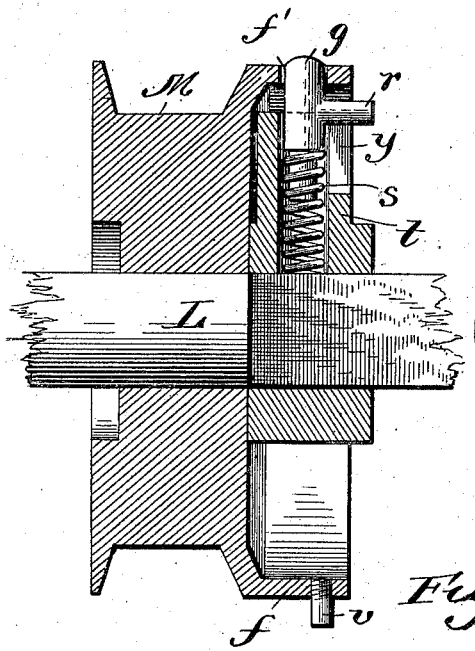
Figure 4:
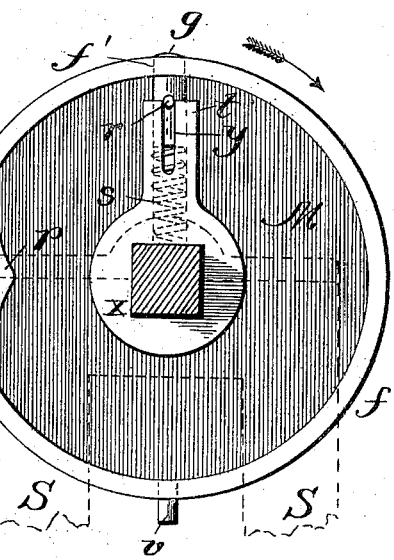
Figure 5:
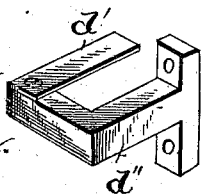
Figure 6:
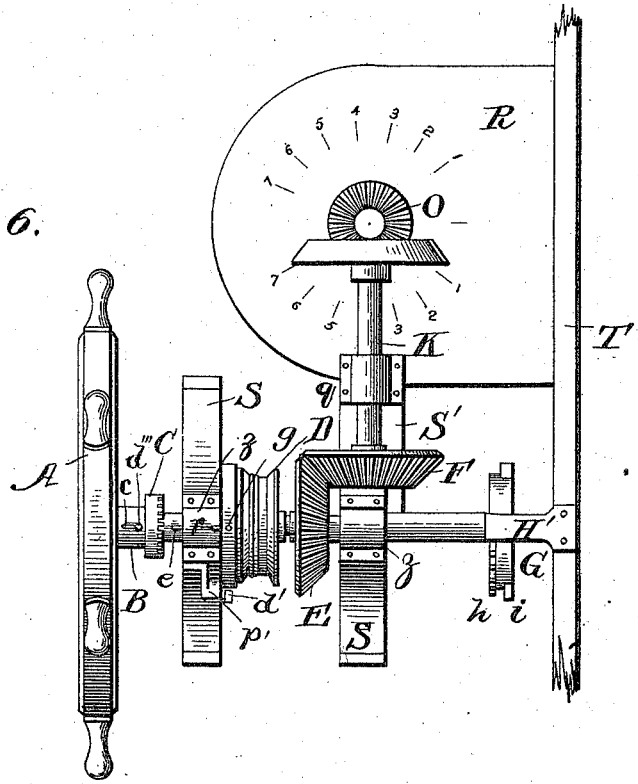
Figure 7:
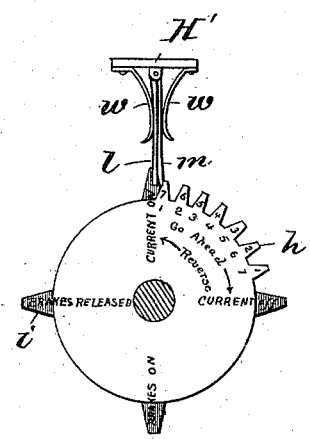
Figure 10:
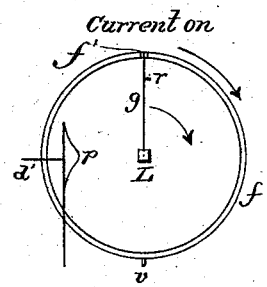
Figure 11:
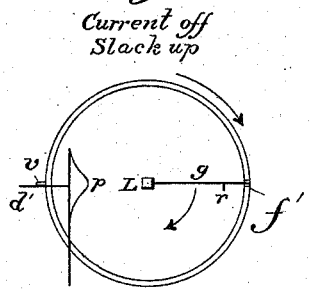
Figure 12:
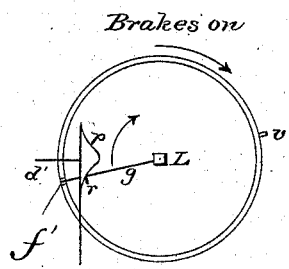
Figure 13:
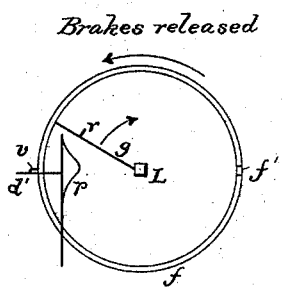
Figure 14:
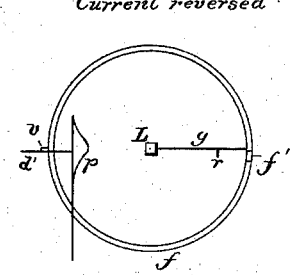
Figure 15:
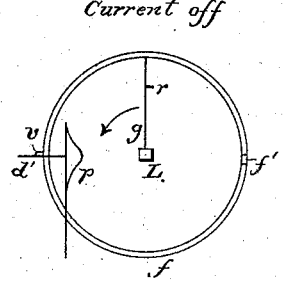
Figure 16:
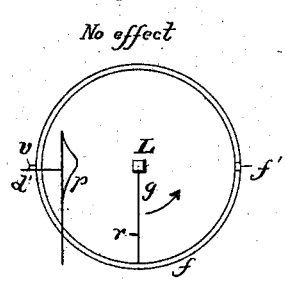
Figure 17:
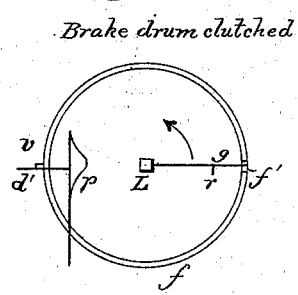
Figure 18:
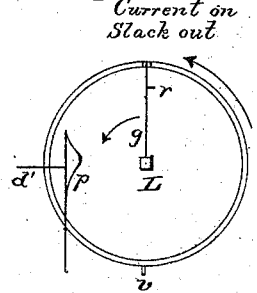

Figure 1 is a vertical longitudinal section of the platform and dashboard of a car with our invention shown in side elevation applied thereto and dial-wheel in section. Fig. 2 is a top plan view of our invention, dial-wheel in section. Fig. 3 is a sectional elevation of the brake drum and clutch. Fig. 4 is a front elevation thereof, showing the brake-drum-releasing mechanism. Fig. 5 is a detail of the spring-recoil stop. Fig. 6 is a modification hereinafter referred to. Fig. 7 is a front elevation of the indicator-dial. Figs. 8 and 9 are details of the means for fastening hand-wheel to shaft. Figs. 10 to 18 are diagrammatic views showing the different operating positions of the clutch mechanism and controller.

In the drawings, where the same characters represent the same or corresponding parts in all the views, A indicates a hand-wheel which is slidably mounted upon the square end of the operating-shaft L, upon which shaft is similarly mounted the crown-wheel C, which is provided with projections B, and to which the hand-wheel A is connected in its longitudinal movements by means of a set-screw or pin $d$, passing through the projection B between the face of the hand-wheel and lugs $l'$, projecting therefrom. By this construction the rotation of the hand-wheel A in either direction will cause the shaft to rotate therewith, while the said hand-wheel may cause the crown-wheel C to move longitudinally on the shaft a limited distance for the purpose hereinafter described, and the hand-wheel and crown-wheel being separable the said hand-wheel may be moved from the actuating-shaft without unlocking the same, such a result being desirable when only a single hand-wheel is used to the car; or, if desired, the shaft end may be round, in which case the collar is connected thereto by a set-screw $d'''$, passing through a slot $c$ in the collar and into the shaft, as shown in Fig. 6.

The shaft L is mounted in suitable bearings $z$, which are secured to the tops of the two frames S, mounted upon the floor V of the platform, to which said frames are suitably secured, thereby forming a convenient support for the actuating-shaft L and the mechanism operated thereby. Projecting from the front end of the part B is a crown-wheel C, the teeth of which are adapted to engage with a stop pin or lug $e$, rigidly secured thereto or projecting from the rear bearing $z$ for the purpose of locking the hand-wheel A and shaft L against rotation.

By sliding the wheel and crown longitudinally of the shaft the lug or pin $e$ engages the teeth of the crown-wheel C, thus locking the shaft and wheel rigidly in any position.

Mounted upon the shaft L, Figs. 1 and 2, is a mutilated bevel-gear M, having teeth upon only one-quarter of its periphery, the said teeth arranged to mesh at certain times during the rotation of the shaft L with the teeth of the bevel-gear O on the ordinary controller-shaft $o$, projecting through the controller-box R. The diameter of this gear M is twice that of the gear O, so that a single revolution of the gear M causes a half-revolution of the gear O, the two gears being so timed as to control the various movements of the current or the connections of the circuits during a single revolution of the actuating-shaft. The construction thus described is the preferable form of this part of our invention, but modifications thereof may be used, such, for example, as that shown in Fig. 6. In this modification there is mounted upon the shaft L a bevel-gear E, meshing with corresponding bevel-gear F on a counter-shaft K, journaled in a bearing $q$ on a suitable support S', extending from the frame S, which counter-shaft carries the mutilated bevel-gear M, meshing with the bevel-gear O, as in the construction before described.

Loosely mounted upon the shaft L is a brake-drum D, around which passes the chain or rope X, leading through a hole in the bottom of the platform V, around a small wheel or pulley P, and connected to the brake-rod underneath the car. This brake cylinder or drum is connected to the shaft L by a suitable clutch mechanism, a convenient form of which we have shown in detail in Figs. 3 and 4, where X' indicates a collar mounted upon a square portion of, or otherwise suitably secured thereto, the shaft L, so as to rotate therewith at all times, from which collar extends a tube $t$, provided with a vertical slot $y$. In the tube $t$ is a spring-operated pin or plunger $g$, normally pressed outward by suitable spring $s$, from the side of which plunger projects a guide-pin $r$, working in the slot $y$. This clutch mechanism is located within the recess of the brake-drum D, formed by the projecting annular flange $f$, so that the outer end of the plunger $g$ normally engages the hole $f'$ in the flange $f$, thereby locking the drum to the shaft L. The flange $f$ may be provided with a socket or recess, if desired, for engaging with the plunger $g$, as it is obvious that it is not necessary to employ the specific means shown to effect the result intended; and a recoil stop-pin $v$ is preferably fixed to the flange of said drum opposite the hole $f'$, for a purpose hereinafter described.

Secured to the side of the frame S is a cam $p$, located in the path of the pin $r$, and as the latter is carried around with the brake-drum it comes in contact with the cam $p$, which presses it and the plunger $g$ toward the shaft, thereby withdrawing the plunger from the hole $f'$ in the flange of the brake-drum, thus automatically releasing the brake-drum from the shaft at a predetermind point for releasing brakes, the clutch mechanism being thus operated solely by the rotation of the actuating-shaft. When the brakes are thus released, the drum recoils, and we preferably provide means for stopping this recoil at a fixed point, so as to insure the drum being clutched to the shaft at the same point. This result is effected in the present instance by a spring-stop $d'$, Figs. 1, 2, and 5, carried by an angle-bar $d''$, secured to the flange of the cam $p$, the said spring being of such tension as to offer sufficient resistance to the stop-pin $v$ on the drum, when the latter is released and recoils, to stop and hold it from further movement, but is not strong enough to prevent the drum from rotating when clutched to the shaft.

In Fig. 6 a modified form of the cam is shown at $p'$, in which case the cam is formed on a Z-bar, attached to the side of the bearing, to which bar the spring $d'$ may be secured.

Further rotation of the shaft after the drum is released carries the plunger around until it again registers with the hole or socket in the drum, whereupon the spring presses the said plunger into engagement therewith, as hereinafter more fully set forth.

Fixed to the shaft L, near the dash board T of the car, is an indicator-dial G, provided with two sets of teeth $i\ h$, the latter of which are shorter than the former, as shown in Fig. 7, the face of which dial is provided with numbers corresponding to those on the top of the controller-boxes and with arrows marked and indicating "Go ahead" and "Reverse." The teeth $i$ are marked to indicate "Current on," "Current off," "Brakes on," "Brakes released," while the teeth $h$, seven in number, indicate the intermediate positions between "Current on" and "Current off," corresponding with the indications on the top of the controller-box, thus indicating by visual devices the various movements of current and brakes.

Secured to a bar H', extending from the front support S, are two leaf-spring pawls $l\ m$, with their upper ends projecting into the path of the teeth $h$ and $i$, respectively, offering slight resistance to the passage of said teeth as they contact therewith in the rotation of the indicator-dial. These pawls may be constructed and arranged as shown in Figs. 6 and 7, where the bar H' projects from the top of the dashboard and carries the two pivoted pawls $l$ and $m$, against which the springs $w$ press, so as to offer a slight resistance to the passage of the teeth $i\ h$ as the latter contact with their corresponding pawls $m\ l$, but the first construction described is the preferable. In the rotation of the shaft L the said pawls are struck by their respective teeth in succession, giving forth audible clicks or alarms, thus calling attention of the motorman or operator to the dial, so that he may instantly see which direction the current is being turned and also note when the brakes are on and when released.

In the drawings the apparatus is shown in the position of the current full on, the brakes being released and the wheel A and shaft free to turn, and the full operation of our apparatus may best be understood by reference to the diagrammatic views, Figs. 10 to 18, Fig. 10 indicating the relative position of the parts with current full on, the arrows indicating the direction in which the several parts are being moved. If it is desired now to turn the current off and apply the brakes, the hand-wheel A is turned from right to left one-quarter of a revolution, Fig. 11, by which action motion is transmitted to the gear-wheel O, which makes one-half a revolution from left to right, thus turning off the current. During this first one-quarter of the revolution from right to left of the shaft L, and consequently of the brake-cylinder D, the latter takes up the slack in the rope or chain X, and during the next one-half of a revolution, Fig. 12, said drum applies the brakes, at the end of which the pin $r$ will have moved to the position shown in said Fig. 12, so that a further turn of the wheel A and the shaft L, Fig. 13, will cause the pin $r$, through the medium of the cam $p$, to press the plunger $g$ inwardly, thereby releasing the brake-drum and the brakes, whereupon the drum recoils and the pin $v$ strikes against the spring-stop $d'$ and is stopped thereby. The further revolution of the hand-wheel A through the next one-quarter revolution will have no effect on either current or brakes, but passing through the next one-quarter of a revolution, Fig. 14, the teeth of the gear M will have again engaged the gear O, causing said gear to turn a half-revolution from left to right, thus reversing the current. If now the wheel A be turned from left to right, Fig. 15, the current is turned off the first quarter of a revolution, and during the next two quarters, Fig. 16, no effect is had upon the brake or current, and in the third quarter, Fig. 17, when the plunger $g$, which is carried around with the shaft L, said plunger again alines with hole $f'$ and engages the brake-drum D, thereby locking it to the shaft, so that during the last one-quarter of a revolution the slack in chain or rope X is given out, the current turned on, and the apparatus again in the position shown in the drawings, Fig. 18.

It will be seen from the foregoing description that our invention can be readily applied to cars now in use as well as to cars building in the first instance, since it is only necessary to supply the upper end of the regulator-shaft with a bevel-gear, replacing the ordinary wheels or handles, while the other parts of our apparatus can be readily mounted upon the platform in the position shown in the drawings.

By combining the brake-actuating mechanism and the controlling or regulating mechanism, so that they may be operated by one actuating device, better control of the car is manifestly secured, and the danger of collision or accident of any kind is materially lessened, while the brake action can be effected in less time and with greater ease than with the usual form of separate brake and controller mechanism; and the location of the indicating-dial on the same shaft as the actuating-wheel and directly in front of the operator or motorman enables the operator or motorman to more readily comprehend the different positions of the regulator and brakes without diverting his attention from the track ahead, the addition of the audible alarms adding greatly to this desirable result. Our invention therefore conduces not only to quickness of control, but to safety as well, and its simplicity makes it of easy operation in the hands of even unskilled persons.

While we have shown what we now consider as a preferred form of our invention, it is obvious that changes may be made in the details without departing from the spirit of our invention, as hereinafter claimed.

We are aware that it has been proposed to operate the brake and regulator mechanism of electric cars from a single actuating device, and such we do not claim, broadly; but

We claim as our invention—

1. In a controlling device for electric cars, the combination with the regulator or controller, and brake-operating devices, of an actuating-shaft rotatably mounted in suitable bearings and held against longitudinal movement therein, and clutch mechanism located between said actuating-shaft and brake-operating devices, with means for automatically causing the clutch mechanism to connect and release the actuating-shaft and brake-operating devices at predetermined points in the rotation of the shaft, the said means being operated solely through the rotation of the actuating-shaft, substantially as described.

2. In a controlling device for electric cars, the combination with the regulator or controller for the current, of an actuating-shaft, connections between said actuating-shaft and controller or regulator, a brake-drum loosely mounted on the shaft for operating the brakes, clutch mechanism operated solely by the rotation of the shaft and located between said shaft and drum for automatically connecting the drum to and releasing it from the shaft at predetermined points in its rotation, substantially as and for the purpose set forth.

3. In a controlling device for electric cars, the combination with the regulator or controller shaft provided with a bevel-gear, of a horizontal shaft provided with a hand-wheel for operating the same, a mutilated bevel-gear mounted on said shaft and meshing with the bevel-gear on the controller-shaft, the said gears being so timed that by a single revolution of the actuating-shaft the current may be turned off and reversed, substantially as and for the purpose specified.

4. In a controlling device for electric cars, the combination with an actuating-shaft provided with a suitable hand-wheel for operating the same, a regulator-shaft having a gear on its upper end, a gear on said actuating-shaft having teeth on one-quarter of its periphery, meshing with the gear on the regulator-shaft, said actuating-shaft gear being twice the diameter of the regulator-gear, a brake-drum mounted on the actuating-shaft, with clutch mechanism between said drum and shaft for automatically locking said drum to and unlocking it from the shaft at predetermined points in its rotation, substantially as specified.

5. In a controlling device for electric cars, the combination with an actuating-shaft mounted in suitable bearings, the regulator and brake mechanism, connections between said shaft and regulator, and connections between said shaft and brake mechanism, of a hand-wheel slidably mounted on the actuating-shaft, with means for rigidly locking the said hand-wheel and through it the shaft against rotation, substantially as described.

6. In a controlling device for electric cars, the combination with the regulator, of an actuating-shaft, connections between said regulator and said actuating-shaft, brake mechanism and connections between the same and said actuating-shaft, a hand-wheel having lugs projecting from its face and slidably mounted on the shaft, a crown-wheel similarly mounted on the shaft and connected at will to hand-wheel by a set-screw or pin passing through a projection on the face of crown-wheel and working between lugs projecting from hand-wheel and the face of said hand-wheel whereby the hand-wheel may cause the crown-wheel to move longitudinally, substantially as described.

7. In a controlling device for electric cars, the combination with the actuating-shaft mounted in suitable bearings, means for regulating the current operated by said shaft, and means for controlling the brakes operated from said shaft and a crown-wheel mounted on said shaft, of a hand-wheel connected at will with the crown-wheel, a fixed lug or pin secured to one of the bearings of the shaft adapted to engage the teeth of the crown-wheel when the wheel is moved longitudinally on the shaft for the purpose of locking the shaft against rotation, substantially as described.

8. In a controlling device for electric cars, the combination with the regulator-shaft provided with a bevel-gear on its upper end, of an actuating-shaft mounted in suitable bearings and provided with a bevel-gear, having interrupted teeth adapted to mesh with the bevel-gear of the regulator-shaft, the said gears being so timed as to control the various connections of the circuits during a single rotation of the actuating-shaft, substantially as described.

9. In a controlling device for electric cars, the combination with the horizontal actuating-shaft mounted in suitable bearings, of the regulator for controlling the current, connections between said actuating-shaft and regulator for operating the same, with a vertical dial-wheel having indicating-teeth projecting from its periphery connected to the actuating-shaft in front of the operator for indicating different positions of the regulator, during the rotation of the actuating-shaft, substantially as described.

10. In a controlling device for electric cars, the combination with the regulator, for controlling the current, of a horizontal actuating-shaft, the brake mechanism and connections between said mechanism and actuating-shaft for operating the brakes, of a vertical dial-wheel having indicating-teeth projecting from its periphery located in front of the operator and connected with the operating-shaft for indicating the different positions of the regulator and the brakes during the rotation of the shaft, substantially as described.

11. In a controlling device for electric cars, the combination with the regulator for controlling the current, of an actuating-shaft, connections between said actuating-shaft and regulator, brake mechanism for operating the brakes, and connections between the shaft and the said brake mechanism, of a dial-wheel mounted on the actuating-shaft and provided with visual indicating devices on its face, for indicating the different positions of the regulator and brakes, and audible alarms corresponding to the indicating devices on the face of the dial operated by the dial-wheel during the rotation of the shaft, substantially as described.

12. In a controlling device for electric cars, the combination with the regulator, of an actuating-shaft mounted in suitable bearings, connections between said shaft and regulator for operating the same, of a dial-wheel mounted on the shaft in front of the operator for indicating the various positions of the regulator as the shaft is turned and provided with a series of teeth on its periphery, with a pawl adapted to contact with the teeth as the shaft and dial are turned, whereby an audible alarm is given at each change of the regulator, substantially as described.

13. In a controlling device for electric cars, the combination with an actuating-shaft mounted in suitable bearings, of the regulator, connections between the regulator and actuating-shaft, the brake mechanism and connections between the actuating-shaft and said brake mechanism, of an audible and visual indicator located in front of the operator and connected with the operating-shaft, whereby the different positions of the brake and regulator are indicated during the rotation of the shaft, substantially as described.

14. In a controlling device for electric cars, the combination of an actuating-shaft and regulator, for controlling the current, connections between the regulator and actuating-shaft, brake mechanism and connections between the same and actuating-shaft, of a dial-wheel mounted on the actuating-shaft in front of the operator and provided with two sets of teeth corresponding with the different positions of the regulator and the brakes, respectively, and two spring-pawls adapted to contact with two separate sets of teeth as the shaft and dial-wheel rotate, substantially as and for the purposes set forth.

15. In a controlling device for electric cars, the combination with the actuating-shaft and the regulator, and with connections between the shaft and regulator, of a brake-drum loosely mounted on a shaft and provided with a projecting flange, a collar fixed to the actuating-shaft, a spring-operated plunger carried by the collar and arranged to lock the drum and collar together, with means for pressing the plunger toward the shaft at predetermined points in its rotation for the purpose of releasing said drum from the shaft, substantially as described.

16. In a controlling device for electric cars, the combination with the actuating-shaft mounted in suitable bearings, of the brake-drum loosely mounted on said shaft, a collar fixed to the shaft and provided with a socket or tube, a plunger in said socket or tube and provided with a projection or pin on its side and normally pressed outward in engagement with the brake-drum, thereby locking the same to the shaft, and a cam located in the path of the projection on the plunger during its rotation, and adapted to press the plunger inward toward the shaft and out of engagement with the drum, substantially as specified.

17. In a controlling device for cars, the combination with an actuating-shaft for the brakes, of a brake-drum loosely mounted on said shaft, mechanism between the drum and shaft for locking the drum to and releasing it from the shaft, at predetermined points in the rotation of the shaft, and a stop for stopping the recoil of the drum after it is released, substantially as described.

18. In a controlling device for cars, the combination with an actuating-shaft, of a brake-drum loosely mounted thereon, automatic clutch mechanism for locking the drum to and releasing it from the shaft at predetermined points in the rotation of the shaft, a spring-stop for stopping the recoil of the drum when released at a fixed point in the rotation of the drum, substantially as described.

19. In a controlling device for cars, the combination with an actuating-shaft, of a brake-drum loosely mounted thereon, and having a lug or pin projecting from its periphery, automatically-operated clutch mechanism between the drum and shaft for locking the drum to and releasing it from the shaft at predetermined points in the rotation of the shaft, and a spring-stop located in the path of the lug or pin on the drum as the latter rotates, said spring being of sufficient tension to stop and hold the drum as it recoils when released, but permitting the said drum to rotate with the shaft when locked thereto, substantially as described.

20. In a controlling device for electric cars, the combination with an actuating-shaft, of a brake-drum loosely mounted thereon, a regulator-shaft, connections between said regulator-shaft and actuating-shaft for controlling the current, clutch mechanism between said brake-drum and actuating-shaft for locking said drum to and releasing it from the shaft at predetermined points in the rotation of the shaft, and a stop for stopping the recoil in the brake-drum when released, but permitting said drum to rotate with said shaft when locked thereto, substantially as described.

In testimony whereof we have signed our names to this specification in the presence of two subscribing witnesses.

WALTER DULIN THOMAS.
LEIGH ROBINSON GIGNILLIAT.

Witnesses:
W. H. BURNEY,
W. B. STUBBS.